US010186923B2

(12) United States Patent
Ueda et al.

(10) Patent No.: US 10,186,923 B2
(45) Date of Patent: Jan. 22, 2019

(54) ARMATURE WINDING OF ROTATING ELECTRICAL MACHINE

(71) Applicant: Kabushiki Kaisha Toshiba, Minato-ku (JP)

(72) Inventors: Takashi Ueda, Yokohama (JP); Masafumi Fujita, Yokohama (JP); Tadashi Tokumasu, Tokyo (JP); Kazuma Tsujikawa, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 303 days.

(21) Appl. No.: 15/270,629

(22) Filed: Sep. 20, 2016

(65) Prior Publication Data

US 2017/0093240 A1    Mar. 30, 2017

(30) Foreign Application Priority Data

Sep. 25, 2015    (JP) ................................. 2015-188565

(51) Int. Cl.
| | |
|---|---|
| *H02K 1/00* | (2006.01) |
| *H02K 3/28* | (2006.01) |
| *H02K 1/16* | (2006.01) |
| *H02K 3/12* | (2006.01) |

(52) U.S. Cl.
CPC ................. *H02K 3/28* (2013.01); *H02K 1/16* (2013.01); *H02K 3/12* (2013.01); *H02K 2213/03* (2013.01)

(58) Field of Classification Search
CPC .. H02K 3/28; H02K 1/16; H02K 3/12; H02K 2213/03

USPC .......................................................... 310/198
See application file for complete search history.

(56) References Cited

U.S. PATENT DOCUMENTS

| | | | | |
|---|---|---|---|---|
| 2,778,963 | A | 6/1955 | Hobermann | |
| 2,778,962 | A * | 1/1957 | Taylor ..................... | H02K 3/28 310/198 |
| 3,408,517 | A | 10/1968 | Willyoung | |
| 3,660,705 | A * | 5/1972 | Willyoung ............... | H02K 3/28 310/198 |
| 8,803,397 | B2 * | 8/2014 | Tokumasu ............... | H02K 3/12 310/195 |
| 2012/0025659 | A1 | 2/2012 | Tokumasu et al. | |

(Continued)

FOREIGN PATENT DOCUMENTS

| | | |
|---|---|---|
| EP | 2 421 124 A1 | 2/2012 |
| GB | 874311 A | 8/1961 |

(Continued)

OTHER PUBLICATIONS

Extended European Search Report dated Mar. 2, 2017 in Patent Application No. 16189611.3.

*Primary Examiner* — Jianchun Qin

(74) *Attorney, Agent, or Firm* — Oblon, McClelland, Maier & Neustadt, L.L.P.

(57) ABSTRACT

According to one embodiment, there is provided a 3-phase even-numbered-pole 2-layered armature winding housed in 45 slots per pole provided in a laminated iron core. The coil pieces corresponding to first, second, and third parallel circuits are placed in the first phase belt, and the coil pieces corresponding to fourth, fifth, and sixth parallel circuits are placed in the second phase belt. The upper coil pieces and the lower coil pieces of each parallel circuit are mutually placed in identical-numbered positions from a pole center.

10 Claims, 10 Drawing Sheets

(56) References Cited

U.S. PATENT DOCUMENTS

| | | |
|---|---|---|
| 2013/0334924 A1 | 12/2013 | Tokumasu et al. |
| 2014/0252907 A1 | 9/2014 | Tokumasu et al. |
| 2015/0162795 A1 | 6/2015 | Tokumasu et al. |
| 2015/0333587 A1 | 11/2015 | Tokumasu et al. |
| 2016/0149455 A1 | 5/2016 | Tokumasu et al. |
| 2016/0322878 A1 | 11/2016 | Tokumasu et al. |

FOREIGN PATENT DOCUMENTS

| | | |
|---|---|---|
| JP | 2001-309597 A | 11/2001 |
| JP | 5367436 | 12/2013 |

\* cited by examiner

US 10,186,923 B2

ARMATURE WINDING OF ROTATING ELECTRICAL MACHINE

CROSS-REFERENCE TO RELATED APPLICATIONS

This application is based upon and claims the benefit of priority from Japanese Patent Application No. 2015-188565, filed Sep. 25, 2015, the entire contents of which are incorporated herein by reference.

FIELD

Embodiments described herein relate generally to an armature winding having six parallel circuits applied to a 3-phase rotating electrical machine having 45 slots per pole.

BACKGROUND

In a large-capacity rotating electrical machine, an armature winding is provided with upper and lower coil pieces arranged in slots of a laminated iron core in a two-layer structure, and parallel circuits are connected in series, thereby increasing the generated voltage and machine capacity. However, as a voltage of an armature winding is increased, the thickness of the main insulation of an armature winding is increased to withstand such higher voltage. As a result, a cross-sectional area of a conducting portion is reduced, and a current density increases, so that a loss increases.

Particularly, in an indirect cooling type machine in which the armature winding is cooled from an outer side of the main insulation, as the thickness of the main insulation increases, a thermal resistance increases, and a temperature disadvantageously increases in the armature winding. For this reason, an armature winding is divided into multiple parallel circuits, thereby decreasing the voltage of the armature winding and the thickness of the main insulation, reducing the loss, and increasing the cooling capacity, while maintaining the machine capacity. Further, in an indirect cooling type large-capacity machine, it is common to increase the number of slots in the armature winding to increase a cooling cycle of the armature winding. Therefore, an armature winding having three or more parallel circuits is desirable.

If the armature winding having three or more parallel circuits is applied to a 2-pole machine, the voltages generated by the parallel circuits are not completely equated, and an eddy current is generated between the parallel circuits, and a loss in the armature winding increases disadvantageously.

In order to reduce such a loss cause by the circulation current, it is necessary to minimize imbalance between the voltages generated by the parallel circuits. For this purpose, a special consideration is required in placement of coils of each parallel circuit in each phase belt.

An example of improvement in the placement of coils will be described with reference to FIG. 9, which is a developed perspective view illustrating a part of an armature winding for one phase.

FIG. 9 illustrates an example of an armature winding having four parallel circuits applicable to a 3-phase 2-pole 72-slot rotating electrical machine as discussed in the U.S. Pat. No. 2,778,962 (hereinafter, referred to as "Taylor's patent").

While FIG. 9 illustrates a part of an armature winding for only one phase, it is obvious that the same configuration as that of FIG. 9 may be similarly applied to the other two phases shifted by 120° and 240°.

In Taylor's patent, assuming that the parallel circuits are numbered "1 to 4," twelve parallel circuits of upper and lower coil pieces 15 and 16 of a first phase belt 17 are numbered "122121121221" sequentially from a pole center. Similarly, parallel circuits of upper and lower coil pieces 15 and 16 of a second phase belt 18 are numbered "344343343443" sequentially from the pole center. This decreases a deviation of voltage (an absolute value of a deviation from an average phase voltage) and a deviation of phase difference (a deviation of phase angle from an average phase voltage) of each parallel circuit.

To realize such a connection, in FIG. 9, fourteen jumper wires 20a per phase are provided in a connection side coil end 19a.

Meanwhile, a technique for reducing deviations in the voltage and the phase angle between each parallel circuit is discussed in U.S. Pat. No. 2,778,963 (hereinafter, referred to as "Habermann's patent").

In Habermann's patent, a voltage deviation between each parallel circuit is rated at 0.4% or smaller, and a phase angle deviation is rated at 0.15° or smaller. However, in Taylor's patent, the voltage deviation is rated at 0.12%, and the phase angle deviation is rated at 0°. It is conceived that these values are highly balanced and sufficiently efficient to decrease an eddy current under the same condition.

The connection method of Taylor's patent described above provides an armature winding having four parallel circuits applicable to a 3-phase 2-pole 72-slot rotating electrical machine. However, in an indirect cooling type large-capacity rotating electrical machine, it is necessary for the armature winding to have a greater number of parallel circuits. In this regard, as illustrated in FIG. 10, a connection method for an armature winding of a 2-pole 72-slot rotating electrical machine having six parallel circuits is known in the art. However, although this connection method provides an armature winding having six parallel circuits applicable to a 3-phase 2-pole 72-slot rotating electrical machine, its application is limited only to the 3-phase 2-pole 72-slot rotating electrical machine.

In the future, it is anticipated that a novel large-capacity technology is employed in the indirect cooling type large-capacity rotating electrical machine, and this may increase the number of windings to obtain a satisfactory generation voltage. For this purpose, it is desired to implement an armature winding having a greater number of slots. For example, it is desired to implement an armature winding of a rotating electrical machine having six parallel circuits applied to a 3-phase rotating electrical machine having 45 slots per pole.

DETAILED DESCRIPTION

Embodiments will now be described with reference to the accompanying drawings.

In general, according to one embodiment, there is provided a 3-phase even-numbered-pole 2-layered armature winding housed in 45 slots per pole provided in a laminated iron core of a rotating electrical machine, comprising: six parallel circuits provided for each phase of the winding and divided into a pair of phase belts including first and second phase belts, each parallel circuit including upper and lower coil pieces which are connected to each other in series in a connection side coil end and a counter-connection side coil end, wherein the coil pieces corresponding to first, second, and third parallel circuits are placed in the first phase belt, and the coil pieces corresponding to fourth, fifth, and sixth parallel circuits are placed in the second phase belt, and the upper coil pieces and the lower coil pieces of each parallel circuit are mutually placed in identical-numbered positions from a pole center.

First Embodiment

First, a first embodiment will be described with reference to FIG. 1.

Figure 1:
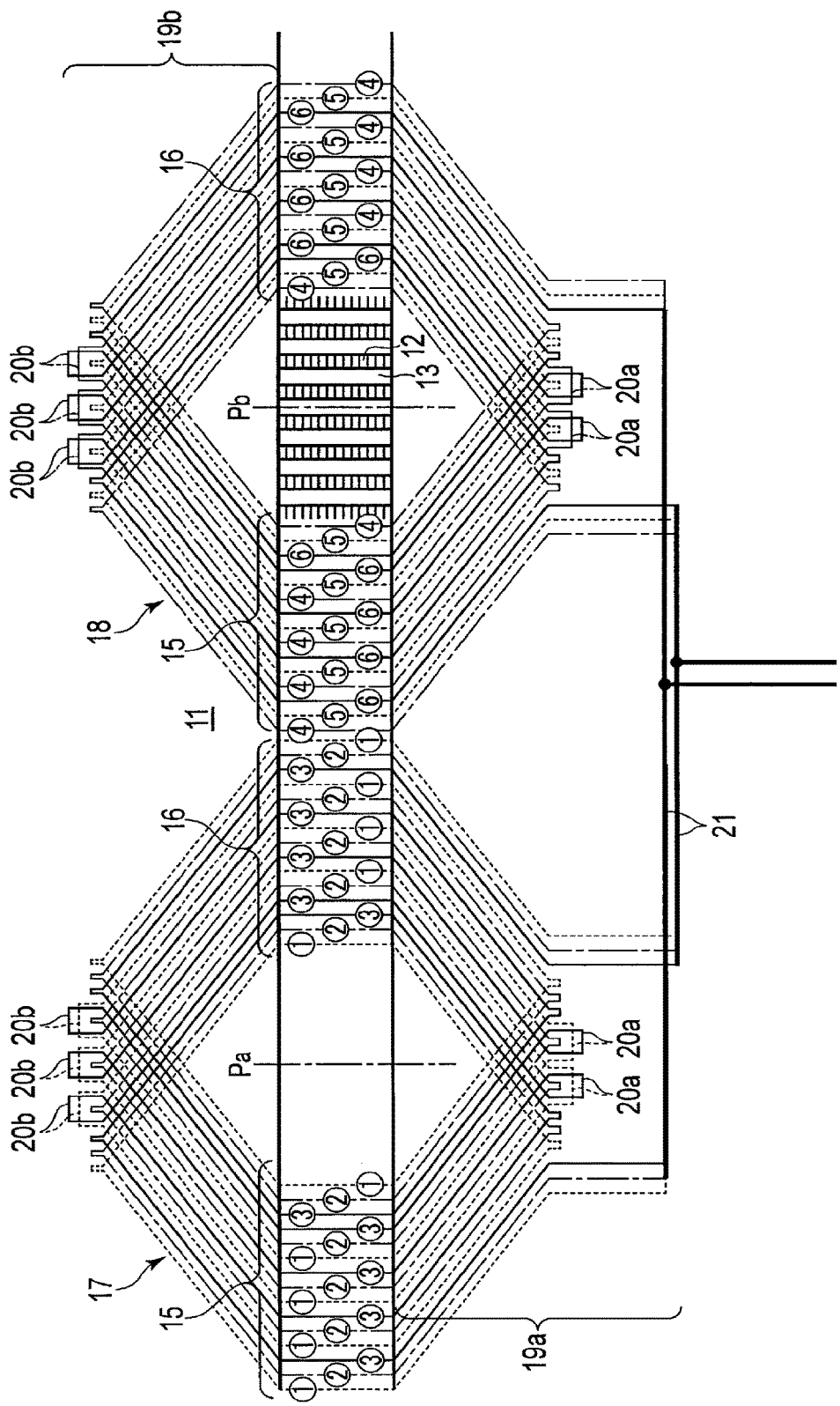
FIG. 1 is a developed perspective view illustrating a part of an armature winding of a rotating electrical machine for two poles/one phase according to a first embodiment.

FIG. 1 is a developed perspective view illustrating a part of an armature winding of a rotating electrical machine for two poles/one phase according to a first embodiment.

An armature 11 of the rotating electrical machine of FIG. 1 has a 3-phase even-numbered-pole 2-layered armature winding. In the example of FIG. 1, a laminated armature core 12 is provided with forty five slots 13 per pole. The 2-pole 3-phase armature winding that forms six parallel circuits is housed in the slots 13 in a two-layer structure. In the case of a 3-phase 2-pole rotating electrical machine (2-pole machine), the total number of slots is "90."

The armature winding of each phase has upper coil pieces 15 housed in the upper part of the slot 13 and lower coil pieces 16 housed in the lower part of the slot 13. The ends of the upper and lower coil pieces 15 and 16 are connected in series at a connection side coil end 19a connected to a lead-out portion of the winding, and at a counter-connection side coil end 19b located axially opposite to the connection side coil end 19a and not connected to the lead-out portion of the winding. Further, the armature winding has a first phase belt 17 in which the upper and lower coil pieces 15 and 16 are housed in the fifteen slots 13 provided in the armature core 12, and a second phase belt 18 in which the upper and lower coil pieces 15 and 16 are housed in the fifteen slots 13.

Here, each of the first and second phase belts refers to a group of coils assigned with the same phase by dividing each of 3-phases into two parts and housing the upper and lower coil pieces in 45 slots per pole of the laminated iron core (armature core) in a two-layer structure and sequentially connecting them in series.

The armature winding of each phase has six parallel circuits. The parallel circuits are given circled numbers 1, 2, 3, 4, 5, and 6 for identification in the drawings. Note that the circuit numbers are assigned to identify the parallel circuits for convenience of explanation, and may be given any symbol in any order.

In each phase belt 17 and 18, the upper coil piece 15 is connected to the corresponding lower coil piece 16 in the connection side coil end 19a and the counter-connection side coil end 19b apart by a predetermined coil pitch to form six parallel circuits. The parallel circuits are connected in parallel through the lead-out connection conductor 21 provided in the connection side coil end 19a to form an armature winding. In FIG. 1, the coil pitch is set to a small value of "⅔" by way of example. This coil pitch is just for easy understanding, and may be set to any other value without limitation.

As shown in FIG. 1, eight jumper wires 20a per phase are provided in the connection side coil ends 19a of the phase belts 17 and 18, and twelve jumper wires 20b per phase are provided in the counter-connection side coil ends 19b, so that the circuits of the upper and lower coil pieces 15 and 16 of the first phase belt 17 are numbered "1, 2, 3, 3, 2, 1, 3, 2, 1, 3, 2, 1, 3, 2, 1" sequentially from the pole center, and the circuits of the upper and lower coil pieces 15 and 16 of the second phase belt 18 are numbered "4, 5, 6, 6, 5, 4, 6, 5, 4, 6, 5, 4, 6, 5, 4" sequentially from the pole center.

As a result, when relative positions of the upper and lower coil pieces 15 and 16 in each phase belt are expressed by positions from the pole center, the upper and lower coil pieces 15 and 16 of each parallel circuit are placed as shown in Table 1.

TABLE 1

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | 1 | | | | | 1 | | |
| | Lower coil piece | 1 | | | | | 1 | | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | | | 1 | 1 | | | 1 | |
| | Lower coil piece | | | 1 | 1 | | | 1 | |

| Relative positions from pole center | | 9 | 10 | 11 | 12 | 13 | 14 | 15 |
|---|---|---|---|---|---|---|---|---|
| Parallel circuits 1, 4 | Upper coil piece | 1 | | | 1 | | | 1 |
| | Lower coil piece | 1 | | | 1 | | | 1 |
| Parallel circuits 2, 5 | Upper coil piece | | | 1 | | | 1 | |
| | Lower coil piece | | | 1 | | | 1 | |
| Parallel circuits 3, 6 | Upper coil piece | | 1 | | | 1 | | |
| | Lower coil piece | | 1 | | | 1 | | |

As shown in Table 1, five upper and lower coil pieces 15 and 16 for each of the first and fourth parallel circuits are placed in the 1st, 6th, 9th, 12th, and 15th positions from the pole center, and five upper and lower coil pieces 15 and 16 for each of the second and fifth parallel circuits are placed in the 2nd, 5th, 8th, 11th, and 14th positions from the pole center. In addition, five upper and lower coil pieces 15 and 16 for each of the third and sixth parallel circuits are placed in the 3rd, 4th, 7th, 10th, and 13th positions from the pole center.

Next, imbalance of the voltage generated in one phase will be described. Here, the following definition is generally employed as a means for numerically evaluating the degree of imbalance. Specifically, the voltage expressed by p.u. of only one of the multiple parallel circuits in one phase refers to a ratio between an open-circuit voltage of the corresponding parallel circuit and an average voltage (phase voltage) in the entire phase, and indicates a degree of imbalance in the voltage between the corresponding parallel circuit and the entire phase. Similarly, a phase angle deviation between the open-circuit voltage generated in one parallel circuit and the phase voltage indicates a degree of imbalance in the phase angle of the voltage between the corresponding parallel circuit and the entire phase.

Table 2 shows the degree of balance in the voltage generated from the armature winding according to the first embodiment. However, in the first embodiment, the degree of balance varies depending on the coil pitch. Therefore, in Table 2, the coil pitch is set to "37/45 (82.22%)." As shown in Table 2, in the armature winding according to the first embodiment, a voltage deviation (a deviation of a p.u. voltage from 1.0) is 0.16% at most, and a phase angle deviation is 0.00°. From Table 2, it is recognized that the armature winding according to the first embodiment satisfies the balance requirement of Habermann's patent, in which the voltage deviation be set to 0.4% or smaller and the phase angle deviation be set to 0.15° or smaller.

TABLE 2

| Parallel circuit | 1 | 2 | 3 |
|---|---|---|---|
| Voltage Deviation [p.u.] | −0.0313 | 0.1627 | −0.1313 |
| Voltage phase [°] | 0.0000 | 0.0000 | 0.0000 |

| Parallel circuit | 4 | 5 | 6 |
|---|---|---|---|
| Voltage Deviation [p.u.] | −0.0313 | 0.1627 | −0.1313 |
| Voltage phase [°] | 0.0000 | 0.0000 | 0.0000 |

Table 3 shows a change in the maximum values of the voltage deviation and the phase angle deviation depending on a coil pitch according to the first embodiment. When the coil pitch is within a range of 36/45 to 39/45, the degree of balance satisfies the balance requirement of Habermann's patent, in which the voltage deviation be "0.4%" or smaller and the phase angle deviation be "0.15°" or smaller. Furthermore, for example, even when the coil pitch varies (when the coil position is deviated), the phase angle deviation does not change (it is maintained at "0.0000°"), so that high reliability is constantly obtained.

TABLE 3

| Coil pitch | 34/45 | 35/45 | 36/45 | 37/45 | 38/45 | 39/45 |
|---|---|---|---|---|---|---|
| Voltage Deviation[%] | 0.6378 | 0.4648 | 0.2962 | 0.1627 | 0.1929 | 0.3517 |
| Phase angle Deviation[°] | 0.0000 | 0.0000 | 0.0000 | 0.0000 | 0.0000 | 0.0000 |

| Coil pitch | 40/45 | 41/45 | 42/45 | 43/45 | 44/45 | 45/45 |
|---|---|---|---|---|---|---|
| Voltage Deviation[%] | 0.5081 | 0.6627 | 0.8157 | 0.9676 | 1.1188 | 1.2696 |
| Phase angle Deviation[°] | 0.0000 | 0.0000 | 0.0000 | 0.0000 | 0.0000 | 0.0000 |

As described above, according to the first embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Second Embodiment

Next, a second embodiment will be described with reference to FIG. 2. Here, the parts common to those of the first embodiment described above (FIG. 1) will not be repeatedly described, and the description will focus on the different parts.

Figure 2:
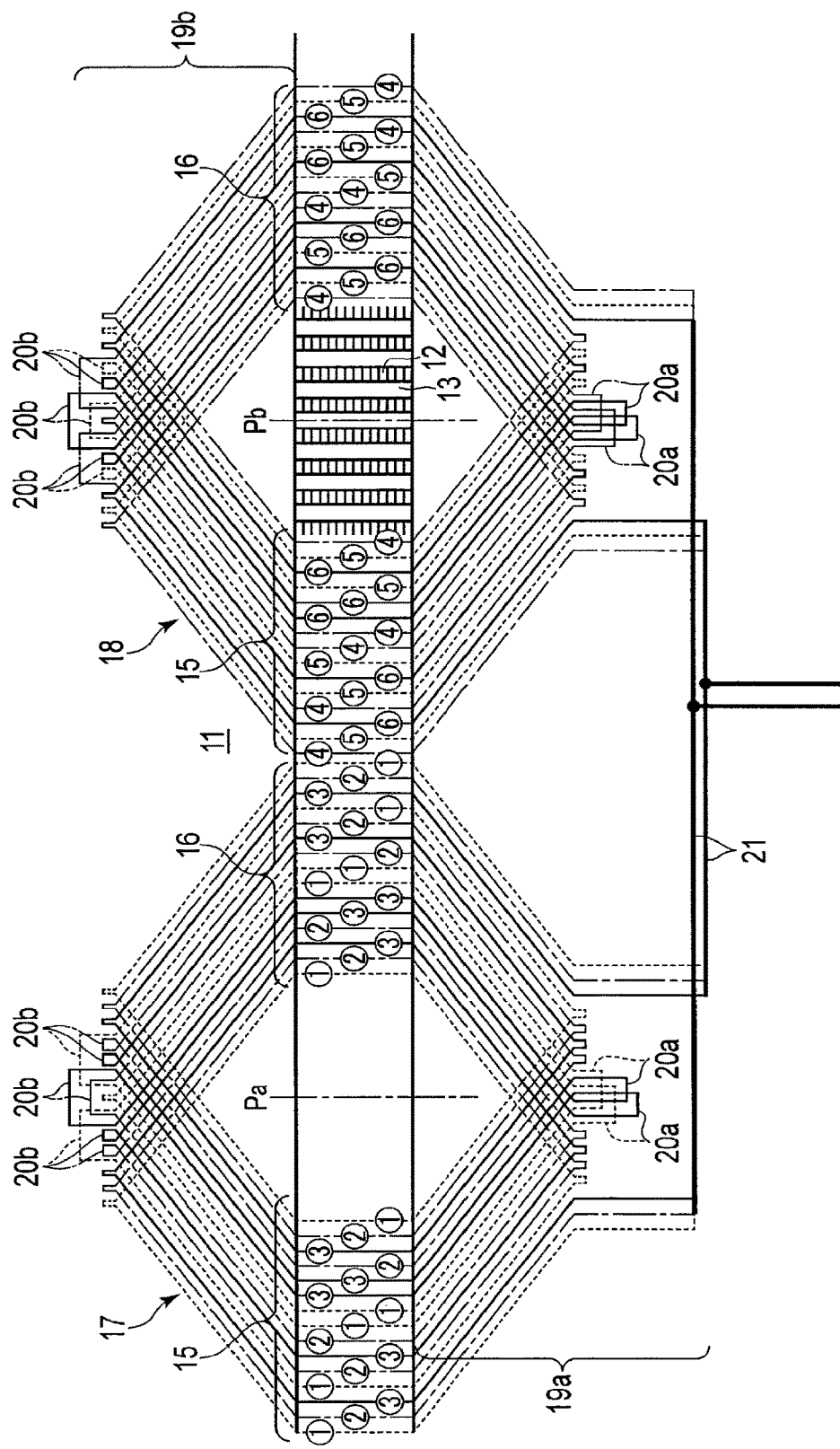
FIG. 2 is a developed perspective view illustrating a part of an armature winding of a rotating electrical machine for two poles/one phase according to a second embodiment.

FIG. 2 is a developed perspective view illustrating a part of an armature winding of a rotating electrical machine for two poles/one phase according to a second embodiment.

As illustrated in FIG. 2, eight jumper wires 20a per phase are provided in the connection side coil ends 19a of the phase belts 17 and 18, and sixteen jumper wires 20b per phase are provided in the counter-connection side coil ends 19b, so that the circuits of the upper and lower coil pieces 15 and 16 of the first phase belt 17 are numbered "1, 2, 3, 2, 3, 3, 1, 1, 2, 3, 2, 1, 3, 2, 1" sequentially from the pole center, and the circuits of the upper and lower coil pieces 15 and 16 of the second phase belt 18 are numbered "4, 5, 6, 5, 6, 6, 4, 4, 5, 6, 5, 4, 6, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 4.

TABLE 4

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | 1 | | | | | | 1 | 1 |
| | Lower coil piece | 1 | | | | | | 1 | 1 |
| Parallel circuits 2, 5 | Upper coil piece | | 1 | | 1 | | | | |
| | Lower coil piece | | 1 | | 1 | | | | |
| Parallel circuits 3, 6 | Upper coil piece | | | 1 | | 1 | 1 | | |
| | Lower coil piece | | | 1 | | 1 | 1 | | |

| Relative positions from pole center | | 9 | 10 | 11 | 12 | 13 | 14 | 15 |
|---|---|---|---|---|---|---|---|---|
| Parallel circuits 1, 4 | Upper coil piece | | | | 1 | | | 1 |
| | Lower coil piece | | | | 1 | | | 1 |
| Parallel circuits 2, 5 | Upper coil piece | 1 | | 1 | | | 1 | |
| | Lower coil piece | 1 | | 1 | | | 1 | |
| Parallel circuits 3, 6 | Upper coil piece | | 1 | | | 1 | | |
| | Lower coil piece | | 1 | | | 1 | | |

As shown in Table 4, five upper and lower coil pieces 15 and 16 for each of the first and fourth parallel circuits are placed in the 1st, 7th, 8th, 12th, and 15th positions from the pole center, and five upper and lower coil pieces 15 and 16 for each of the second and fifth parallel circuits are placed in the 2nd, 4th, 9th, 11th, and 14th positions from the pole center. In addition, five upper and lower coil pieces 15 and 16 for each of the third and sixth parallel circuits are placed in the 3rd, 5th, 6th, 10th, and 13th positions from the pole center.

Table 5 shows the degree of balance of the voltage generated from the armature winding according to the second embodiment. Meanwhile, according to the second embodiment, the degree of balance varies depending on a coil pitch. Therefore, in Table 5, the coil pitch is set to "37/45 (82.22%)." As shown in Table 5, in the armature winding according to the second embodiment, a voltage deviation (a deviation of a p.u. voltage from 1.0) is "0.23%" at most, and a phase angle deviation is "0.00°" It is recognized that these values satisfy the requirement of Habermann's patent, in which the voltage deviation be "0.4%" or smaller, and the phase angle deviation be "0.15°" or smaller.

TABLE 5

| Parallel circuit | 1 | 2 | 3 |
|---|---|---|---|
| Voltage Deviation [p.u.] | 0.1704 | −0.2297 | 0.0593 |
| Voltage phase [°] | 0.0000 | 0.0000 | 0.0000 |
| Parallel circuit | 4 | 5 | 6 |
| Voltage Deviation [p.u.] | 0.1704 | −0.2297 | 0.0593 |
| Voltage phase [°] | 0.0000 | 0.0000 | 0.0000 |

Table 6 shows a change of the maximum values of the voltage deviation and the phase angle deviation depending on a coil pitch according to the second embodiment. When the coil pitch is within a range of "36/45 to 39/45," the degree of balance satisfies the requirement of Habermann's patent, in which the voltage deviation be "0.4%" or smaller, and the phase angle deviation be "0.15°" or smaller. Furthermore, for example, even when the coil pitch varies (when the coil position is deviated), the phase angle deviation does not change (it is maintained at "0.0000°"), so that high reliability is constantly obtained.

TABLE 6

| Coil pitch | 34/45 | 35/45 | 36/45 | 37/45 | 38/45 | 39/45 |
|---|---|---|---|---|---|---|
| Voltage Deviation[%] | 0.6760 | 0.5033 | 0.3350 | 0.2297 | 0.2313 | 0.3823 |
| Phase angle Deviation[°] | 0.0000 | 0.0000 | 0.0000 | 0.0000 | 0.0000 | 0.0000 |
| Coil pitch | 40/45 | 41/45 | 42/45 | 43/45 | 44/45 | 45/45 |
| Voltage Deviation[%] | 0.5400 | 0.6958 | 0.8501 | 1.0033 | 1.1557 | 1.3077 |
| Phase angle Deviation[°] | 0.0000 | 0.0000 | 0.0000 | 0.0000 | 0.0000 | 0.0000 |

As described above, according to the second embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Third Embodiment

Next, a third embodiment will be described with reference to FIG. 3. Here, the parts common to those of the first embodiment described above (FIG. 1) will not be repeatedly described, and the description will focus on the different parts.

Figure 3:
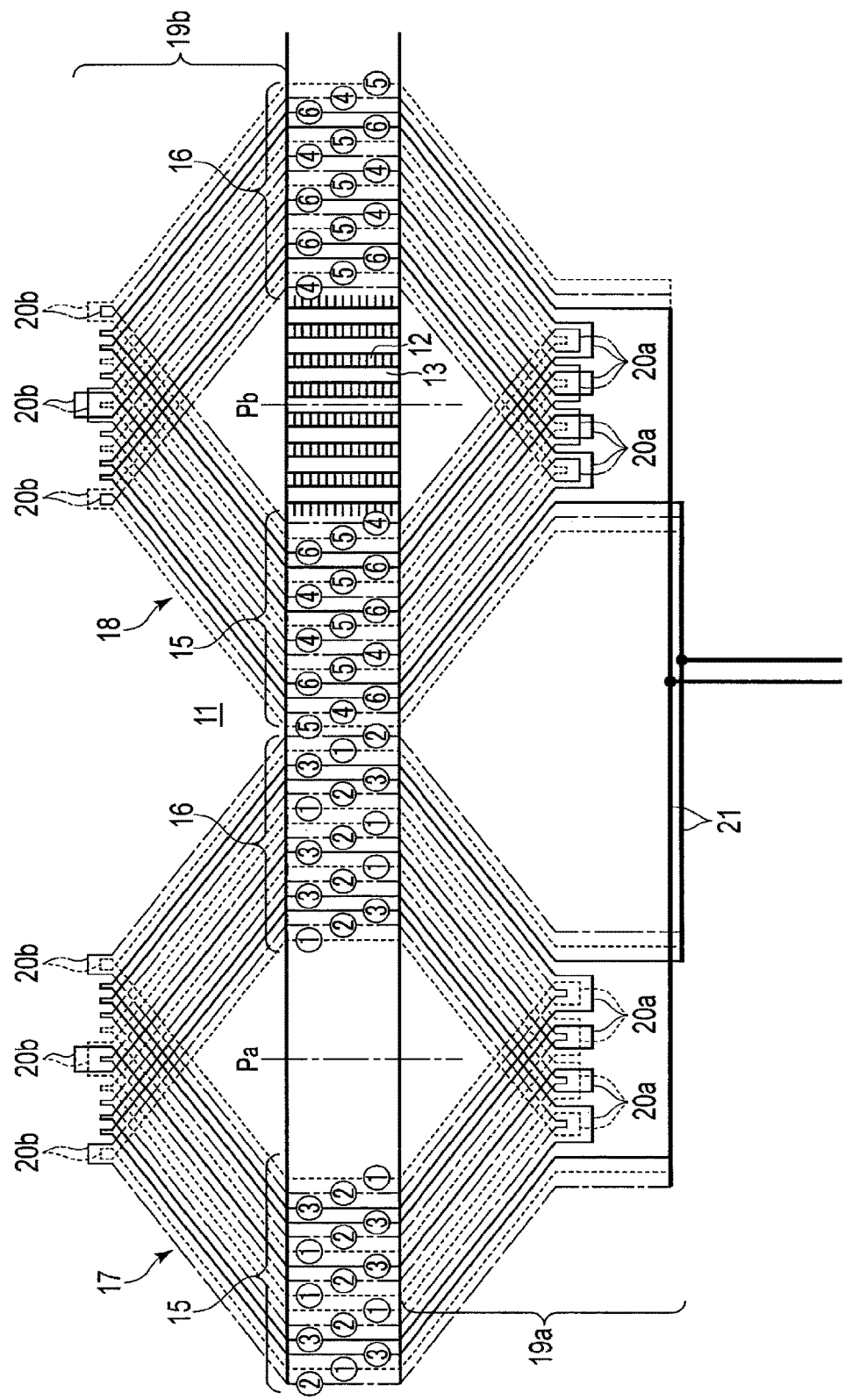
FIG. 3 is a developed perspective view illustrating a part of an armature winding of a rotating electrical machine for two poles/one phase according to a third embodiment.

FIG. 3 is a developed perspective view illustrating a part of an armature winding of a rotating electrical machine for two poles/one phase according to a third embodiment.

As illustrated in FIG. 3, sixteen jumper wires 20a per phase are provided in the connection side coil ends 19a of the phase belts 17 and 18, and twelve jumper wires 20b per phase are provided in the counter-connection side coil ends 19b, so that the circuits of the upper and lower coil pieces 15 and 16 of the first phase belt 17 are numbered "1, 2, 3, 3, 2, 1, 3, 2, 1, 1, 2, 3, 3, 1, 2" sequentially from the pole center, and the circuits of the upper and lower coil pieces 15 and 16 of the second phase belt 18 are numbered "4, 5, 6, 6, 5, 4, 6, 5, 4, 4, 5, 6, 6, 4, 5" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 7.

TABLE 7

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | 1 | | | | | 1 | | |
| | Lower coil piece | 1 | | | | | | 1 | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | | | 1 | 1 | | | 1 | |
| | Lower coil piece | | | 1 | 1 | | | 1 | |
| Relative positions from pole center | | 9 | 10 | 11 | 12 | 13 | 14 | 15 | |
| Parallel circuits 1, 4 | Upper coil piece | 1 | 1 | | | | 1 | | |
| | Lower coil piece | 1 | 1 | | | | 1 | | |
| Parallel circuits 2, 5 | Upper coil piece | | | 1 | | | | 1 | |
| | Lower coil piece | | | 1 | | | | 1 | |
| Parallel circuits 3, 6 | Upper coil piece | | | | 1 | 1 | | | |
| | Lower coil piece | | | | 1 | 1 | | | |

As shown in Table 7, five upper and lower coil pieces 15 and 16 for each of the first and fourth parallel circuits are placed in the 1st, 6th, 9th, 10th, and 14th positions from the pole center, and five upper and lower coil pieces 15 and 16 for each of the second and fifth parallel circuits are placed in the 2nd, 5th, 8th, 11th, and 15th positions from the pole center. In addition, five upper and lower coil pieces 15 and 16 for each of the third and sixth parallel circuits are placed in the 3rd, 4th, 7th, 12th, and 13th positions from the pole center.

Table 8 shows the degree of balance of the voltage generated from the armature winding according to the third embodiment. Meanwhile, according to the third embodiment, the degree of balance varies depending on a coil pitch. Therefore, in Table 8, the coil pitch is set to "37/45 (82.22%)." As shown in Table 8, in the armature winding according to the third embodiment, a voltage deviation (a deviation of a p.u. voltage from 1.0) is "0.10%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 8

| Parallel circuit | 1 | 2 | 3 |
|---|---|---|---|
| Voltage Deviation [p.u.] | 0.0207 | −0.1014 | 0.0807 |
| Voltage phase [°] | 0.0000 | 0.0000 | 0.0000 |
| Parallel circuit | 4 | 5 | 6 |
| Voltage Deviation [p.u.] | 0.0207 | −0.1014 | 0.0807 |
| Voltage phase [°] | 0.0000 | 0.0000 | 0.0000 |

Table 9 shows a change of the maximum values of the voltage deviation and the phase angle deviation depending on a coil pitch according to the third embodiment. When the coil pitch is within a range of "34/45 to 43/45," the degree of balance satisfies the requirement of Habermann's patent, in which the voltage deviation be "0.4%" or smaller, and the phase angle deviation be "0.15°" or smaller. Furthermore, for example, even when the coil pitch varies (when the coil position is deviated), the phase angle deviation does not change (it is maintained at "0.0000°"), so that high reliability is constantly obtained.

TABLE 9

| Coil pitch | 34/45 | 35/45 | 36/45 | 37/45 | 38/45 | 39/45 |
|---|---|---|---|---|---|---|
| Voltage Deviation[%] | 0.0906 | 0.0321 | 0.0512 | 0.1014 | 0.1505 | 0.1988 |
| Phase angle Deviation[°] | 0.0000 | 0.0000 | 0.0000 | 0.0000 | 0.0000 | 0.0000 |
| Coil pitch | 40/45 | 41/45 | 42/45 | 43/45 | 44/45 | 45/45 |
| Voltage Deviation[%] | 0.2464 | 0.2942 | 0.3460 | 0.3974 | 0.4485 | 0.4995 |
| Phase angle Deviation[°] | 0.0000 | 0.0000 | 0.0000 | 0.0000 | 0.0000 | 0.0000 |

As described above, according to the third embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Fourth Embodiment

Next, a fourth embodiment will be described with reference to FIG. 4. Here, the parts common to those of the first embodiment described above (FIG. 1) will not be repeatedly described, and the description will focus on the different parts.

Figure 4:
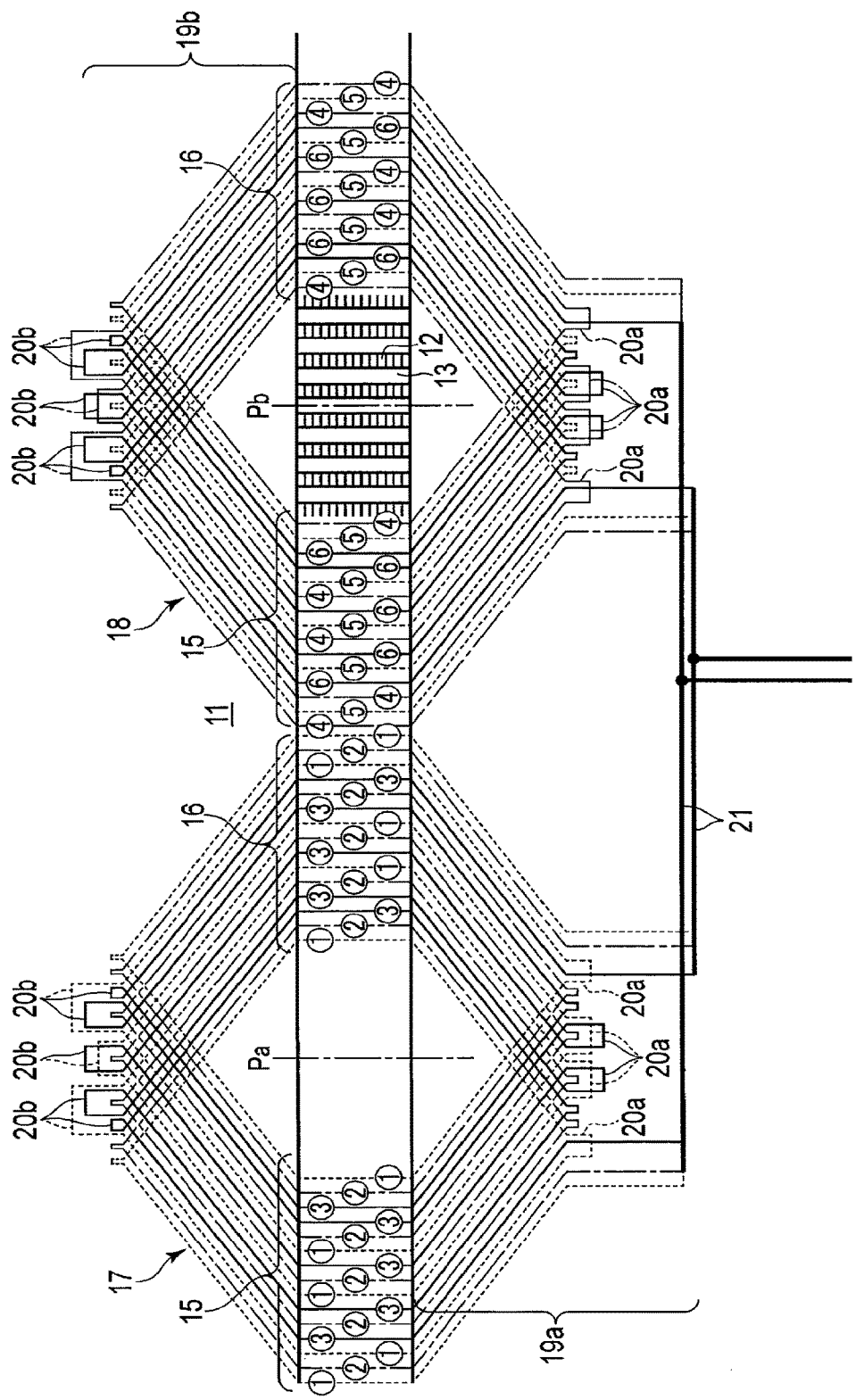
FIG. 4 is a developed perspective view illustrating a part of an armature winding of a rotating electrical machine for two poles/one phase according to a fourth embodiment.

FIG. 4 is a developed perspective view illustrating a part of an armature winding of a rotating electrical machine for two poles/one phase according to a fourth embodiment.

As illustrated in FIG. 4, twelve jumper wires 20a per phase are provided in the connection side coil ends 19a of the phase belts 17 and 18, and sixteen jumper wires 20b per phase are provided in the counter-connection side coil ends 19b, so that the circuits of the upper and lower coil pieces 15 and 16 of the first phase belt 17 are numbered "1, 2, 3, 3, 2, 1, 3, 2, 1, 3, 2, 3, 1, 2, 1" sequentially from the pole center, and the circuits of the upper and lower coil pieces 15 and 16 of the second phase belt 18 are numbered "4, 5, 6, 6, 5, 4, 6, 5, 4, 6, 5, 6, 4, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 10.

TABLE 10

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | 1 | | | | 1 | | | |
| | Lower coil piece | 1 | | | | 1 | | | |
| Parallel | Upper coil piece | | 1 | | 1 | | | 1 | |

TABLE 10-continued

| circuits 2, 5 | Lower coil piece | | 1 | | | 1 | | | 1 |
|---|---|---|---|---|---|---|---|---|---|
| Parallel circuits 3, 6 | Upper coil piece | | | 1 | 1 | | | 1 | |
| | Lower coil piece | | | 1 | 1 | | | 1 | |
| Relative positions from pole center | | 9 | 10 | 11 | 12 | 13 | 14 | 15 |
| Parallel circuits 1, 4 | Upper coil piece | 1 | | | | 1 | | 1 |
| | Lower coil piece | 1 | | | | 1 | | 1 |
| Parallel circuits 2, 5 | Upper coil piece | | 1 | | 1 | | 1 | |
| | Lower coil piece | | 1 | | 1 | | 1 | |
| Parallel circuits 3, 6 | Upper coil piece | | | 1 | 1 | | | |
| | Lower coil piece | | | 1 | 1 | | | |

As shown in Table 10, five upper and lower coil pieces 15 and 16 for each of the first and fourth parallel circuits are placed in the 1st, 6th, 9th, 13th, and 15th positions from the pole center, and five upper and lower coil pieces 15 and 16 for each of the second and fifth parallel circuits are placed in the 2nd, 5th, 8th, 11th, and 14th positions from the pole center. In addition, five upper and lower coil pieces 15 and 16 for each of the third and sixth parallel circuits are placed in the 3rd, 4th, 7th, 10th, and 12th positions from the pole center.

Table 11 shows the degree of balance of the voltage generated from the armature winding according to the fourth embodiment. Meanwhile, according to the fourth embodiment, the degree of balance varies depending on a coil pitch. Therefore, in Table 11, the coil pitch is set to "37/45 (82.22%)." As shown in Table 11, in the armature winding according to the fourth embodiment, a voltage deviation (a deviation of a p.u. voltage from 1.0) is "0.16%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 11

| Parallel circuit | 1 | 2 | 3 |
|---|---|---|---|
| Voltage Deviation [p.u.] | −0.0844 | 0.1627 | −0.0783 |
| Voltage phase [°] | 0.0000 | 0.0000 | 0.0000 |
| Parallel circuit | 4 | 5 | 6 |
| Voltage Deviation [p.u.] | −0.0844 | 0.1627 | −0.0783 |
| Voltage phase [°] | 0.0000 | 0.0000 | 0.0000 |

Table 12 shows a change of the maximum values of the voltage deviation and the phase angle deviation depending on a coil pitch according to the fourth embodiment. When the coil pitch is within a range of "36/45 to 38/45," the degree of balance satisfies the requirement of Habermann's patent, in which the voltage deviation be "0.4%" or smaller, and the phase angle deviation be "0.15°" or smaller. Furthermore, for example, even when the coil pitch varies (when the coil position is deviated), the phase angle deviation does not change (it is maintained at "0.0000°"), so that high reliability is constantly obtained.

TABLE 12

| Coil pitch | 34/45 | 35/45 | 36/45 | 37/45 | 38/45 | 39/45 |
|---|---|---|---|---|---|---|
| Voltage Deviation[%] | 0.7477 | 0.5191 | 0.2962 | 0.1627 | 0.2980 | 0.5079 |
| Phase angle Deviation[°] | 0.0000 | 0.0000 | 0.0000 | 0.0000 | 0.0000 | 0.0000 |

TABLE 12-continued

| Coil pitch | 40/45 | 41/45 | 42/45 | 43/45 | 44/45 | 45/45 |
|---|---|---|---|---|---|---|
| Voltage Deviation[%] | 0.7147 | 0.9190 | 1.1212 | 1.3220 | 1.5219 | 1.7212 |
| Phase angle Deviation[°] | 0.0000 | 0.0000 | 0.0000 | 0.0000 | 0.0000 | 0.0000 |

As described above, according to the fourth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Fifth Embodiment

Next, a fifth embodiment will be described with reference to FIG. 5. Here, the parts common to those of the first embodiment described above (FIG. 1) will not be repeatedly described, and the description will focus on the different parts.

Figure 5:
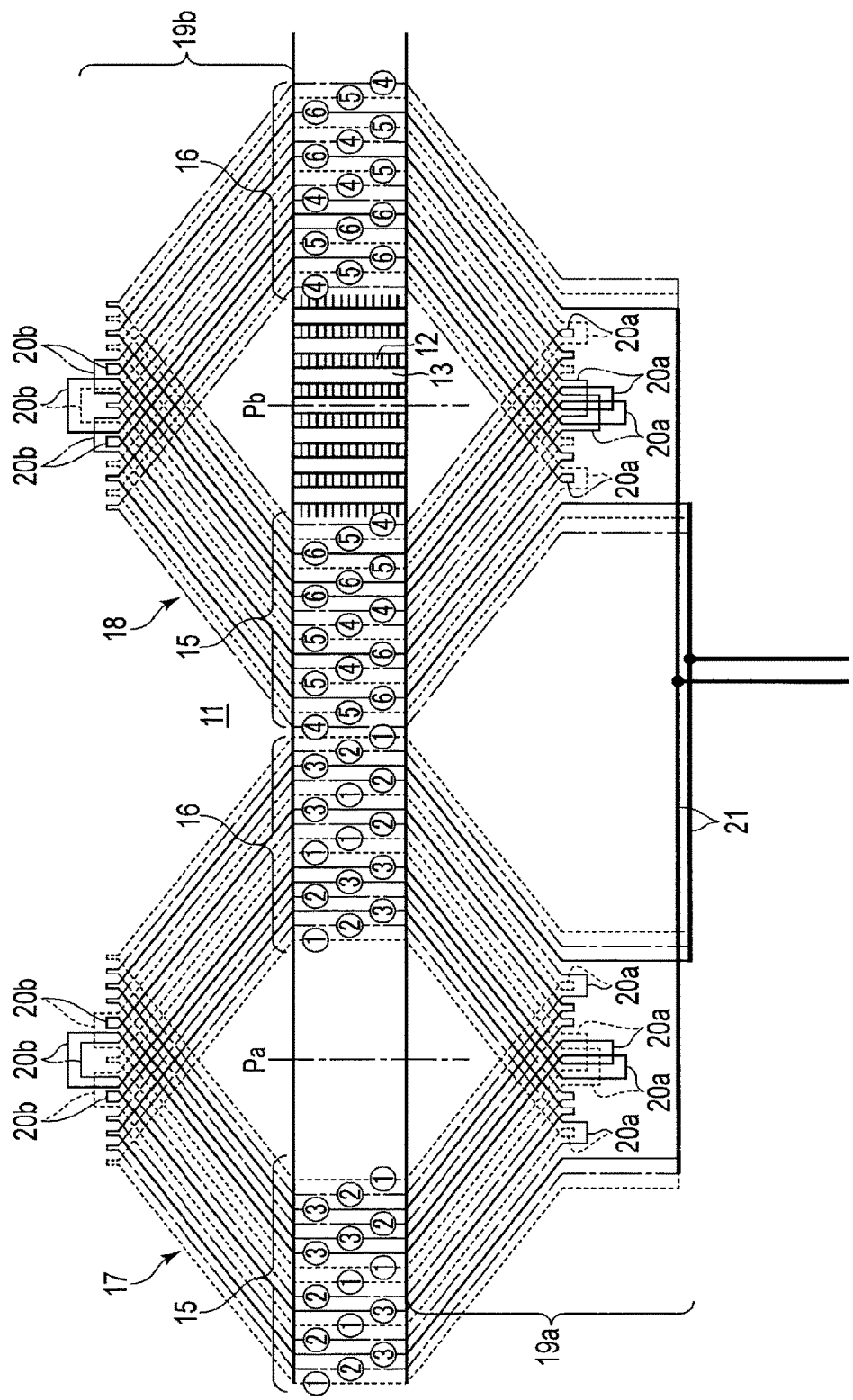
FIG. 5 is a developed perspective view illustrating a part of an armature winding of a rotating electrical machine for two poles/one phase according to a fifth embodiment.

FIG. 5 is a developed perspective view illustrating a part of an armature winding of a rotating electrical machine for two poles/one phase according to a fifth embodiment.

As illustrated in FIG. 5, sixteen jumper wires 20a per phase are provided in the connection side coil ends 19a of the phase belts 17 and 18, and twelve jumper wires 20b per phase are provided in the counter-connection side coil ends 19b, so that the circuits of the upper and lower coil pieces 15 and 16 of the first phase belt 17 are numbered "1, 2, 3, 2, 3, 3, 1, 1, 2, 3, 1, 2, 3, 2, 1" sequentially from the pole center, and the circuits of the upper and lower coil pieces 15 and 16 of the second phase belt 18 are numbered "4, 5, 6, 5, 6, 6, 4, 4, 5, 6, 4, 5, 6, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 13.

TABLE 13

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | 1 | | | | | | 1 | 1 |
| | Lower coil piece | 1 | | | | | | 1 | 1 |
| Parallel circuits 2, 5 | Upper coil piece | | | 1 | | 1 | | | |
| | Lower coil piece | | | 1 | | 1 | | | |
| Parallel circuits 3, 6 | Upper coil piece | | | | 1 | | 1 | 1 | |
| | Lower coil piece | | | | 1 | | 1 | 1 | |

| Relative positions from pole center | | 9 | 10 | 11 | 12 | 13 | 14 | 15 |
|---|---|---|---|---|---|---|---|---|
| Parallel circuits 1, 4 | Upper coil piece | | | 1 | | | | 1 |
| | Lower coil piece | | | 1 | | | | 1 |
| Parallel circuits 2, 5 | Upper coil piece | 1 | | | 1 | | 1 | |
| | Lower coil piece | 1 | | | 1 | | 1 | |
| Parallel circuits 3, 6 | Upper coil piece | | 1 | | | 1 | | |
| | Lower coil piece | | 1 | | | 1 | | |

As shown in Table 13, five upper and lower coil pieces 15 and 16 for each of the first and fourth parallel circuits are placed in the 1st, 7th, 8th, 11th, and 15th positions from the pole center, and five upper and lower coil pieces 15 and 16 for each of the second and fifth parallel circuits are placed in the 2nd, 4th, 9th, 12th, and 14th positions from the pole center. In addition, five upper and lower coil pieces 15 and 16 for each of the third and sixth parallel circuits are placed in the 3rd, 5th, 6th, 10th, and 13th positions from the pole center.

Table 14 shows the degree of balance of the voltage generated from the armature winding according to the fifth embodiment. Meanwhile, according to the fifth embodiment, the degree of balance varies depending on a coil pitch. Therefore, in Table 14, the coil pitch is set to "37/45 (82.22%)." As shown in Table 14, in the armature winding according to the fifth embodiment, a voltage deviation (a deviation of a p.u. voltage from 1.0) is "0.18%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 14

| Parallel circuit | 1 | 2 | 3 |
|---|---|---|---|
| Voltage Deviation [p.u.] | 0.1173 | −0.1767 | 0.0593 |
| Voltage phase [°] | 0.0000 | 0.0000 | 0.0000 |
| Parallel circuit | 4 | 5 | 6 |
| Voltage Deviation [p.u.] | 0.1173 | −0.1767 | 0.0593 |
| Voltage phase [°] | 0.0000 | 0.0000 | 0.0000 |

Table 15 shows a change of the maximum values of the voltage deviation and the phase angle deviation depending on a coil pitch according to the fifth embodiment. When the coil pitch is within a range of "35/45 to 39/45," the degree of balance satisfies the requirement of Habermann's patent, in which the voltage deviation be "0.4%" or smaller, and the phase angle deviation be "0.15°" or smaller. Furthermore, for example, even when the coil pitch varies (when the coil position is deviated), the phase angle deviation does not change (it is maintained at "0.0000°"), so that high reliability is constantly obtained.

TABLE 15

| Coil pitch | 34/45 | 35/45 | 36/45 | 37/45 | 38/45 | 39/45 |
|---|---|---|---|---|---|---|
| Voltage Deviation[%] | 0.4566 | 0.3408 | 0.2278 | 0.1767 | 0.2313 | 0.3823 |
| Phase angle Deviation[°] | 0.0000 | 0.0000 | 0.0000 | 0.0000 | 0.0000 | 0.0000 |
| Coil pitch | 40/45 | 41/45 | 42/45 | 43/45 | 44/45 | 45/45 |
| Voltage Deviation[%] | 0.5400 | 0.6958 | 0.8501 | 1.0033 | 1.1557 | 1.3077 |
| Phase angle Deviation[°] | 0.0000 | 0.0000 | 0.0000 | 0.00.00 | 0.0000 | 0.0000 |

As described above, according to the fifth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Sixth Embodiment

Next, a sixth embodiment will be described with reference to FIG. 6. Here, the parts common to those of the first embodiment described above (FIG. 1) will not be repeatedly described, and the description will focus on the different parts.

Figure 6:
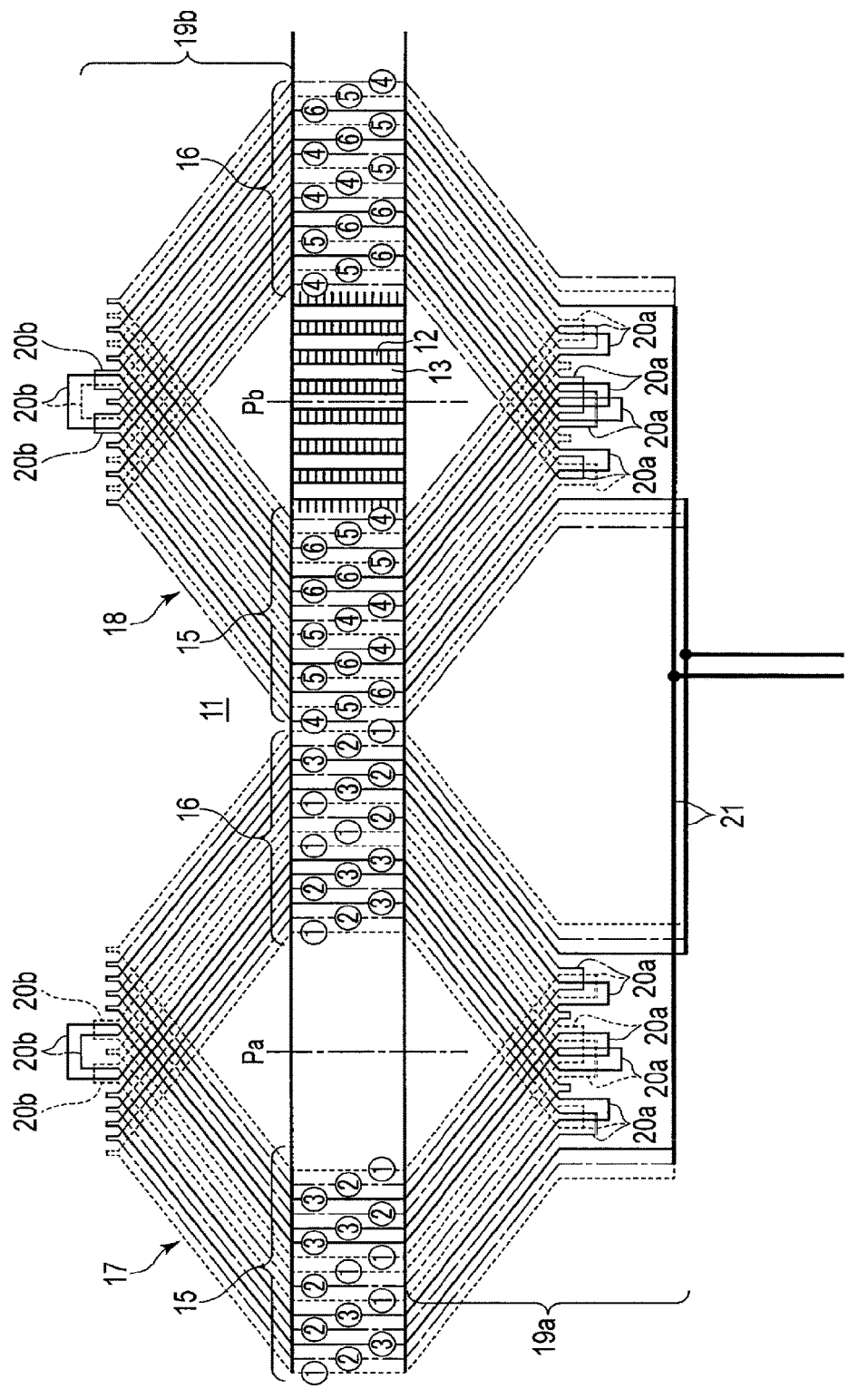
FIG. 6 is a developed perspective view illustrating a part of an armature winding of a rotating electrical machine for two poles/one phase according to a sixth embodiment.

FIG. 6 is a developed perspective view illustrating a part of an armature winding of a rotating electrical machine for two poles/one phase according to a sixth embodiment.

As illustrated in FIG. 6, twenty jumper wires 20a per phase are provided in the connection side coil ends 19a of the phase belts 17 and 18, and eight jumper wires 20b per phase are provided in the counter-connection side coil ends 19b, so that the circuits of the upper and lower coil pieces 15 and 16 of the first phase belt 17 are numbered "1, 2, 3, 2, 3, 3, 1, 1, 2, 1, 3, 2, 3, 2, 1" sequentially from the pole center, and the circuits of the upper and lower coil pieces 15 and 16 of the second phase belt 18 are numbered "4, 5, 6, 5, 6, 6, 4, 4, 5, 4, 6, 5, 6, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 16.

TABLE 16

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | 1 | | | | | | 1 | 1 |
| | Lower coil piece | 1 | | | | | | 1 | 1 |
| Parallel circuits 2, 5 | Upper coil piece | | 1 | | 1 | | | | |
| | Lower coil piece | | 1 | | 1 | | | | |
| Parallel circuits 3, 6 | Upper coil piece | | | 1 | | 1 | 1 | | |
| | Lower coil piece | | | 1 | | 1 | 1 | | |

| Relative positions from pole center | | 9 | 10 | 11 | 12 | 13 | 14 | 15 |
|---|---|---|---|---|---|---|---|---|
| Parallel circuits 1, 4 | Upper coil piece | | 1 | | | | | 1 |
| | Lower coil piece | | 1 | | | | | 1 |
| Parallel circuits 2, 5 | Upper coil piece | 1 | | | 1 | | 1 | |
| | Lower coil piece | 1 | | | 1 | | 1 | |
| Parallel circuits 3, 6 | Upper coil piece | | | 1 | | 1 | | |
| | Lower coil piece | | | 1 | | 1 | | |

As shown in Table 16, five upper and lower coil pieces 15 and 16 for each of the first and fourth parallel circuits are placed in the 1st, 7th, 8th, 10th, and 15th positions from the pole center, and five upper and lower coil pieces 15 and 16 for each of the second and fifth parallel circuits are placed in the 2nd, 4th, 9th, 12th, and 14th positions from the pole center. In addition, five upper and lower coil pieces 15 and 16 for each of the third and sixth parallel circuits are placed in the 3rd, 5th, 6th, 11th, and 13th positions from the pole center.

Table 17 shows the degree of balance of the voltage generated from the armature winding according to the sixth embodiment. Meanwhile, according to the sixth embodiment, the degree of balance varies depending on a coil pitch. Therefore, in Table 17, the coil pitch is set to "37/45 (82.22%)." As shown in Table 17, in the armature winding according to the sixth embodiment, a voltage deviation (a deviation of a p.u. voltage from 1.0) is "0.22%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 17

| Parallel circuit | 1 | 2 | 3 |
|---|---|---|---|
| Voltage Deviation [p.u.] | −0.0416 | −0.1767 | 0.2183 |
| Voltage phase [°] | 0.0000 | 0.0000 | 0.0000 |

TABLE 17-continued

| Parallel circuit | 4 | 5 | 6 |
|---|---|---|---|
| Voltage Deviation [p.u.] | −0.0416 | −0.1767 | 0.2183 |
| Voltage phase [°] | 0.0000 | 0.0000 | 0.0000 |

Table 18 shows a change of the maximum values of the voltage deviation and the phase angle deviation depending on a coil pitch according to the sixth embodiment. When the coil pitch is within a range of "34/45 to 38/45," the degree of balance satisfies the requirement of Habermann's patent, in which the voltage deviation be "0.4%" or smaller, and the phase angle deviation be "0.15°" or smaller. Furthermore, for example, even when the coil pitch varies (when the coil position is deviated), the phase angle deviation does not change (it is maintained at "0.0000°"), so that high reliability is constantly obtained.

TABLE 18

| Coil pitch | 34/45 | 35/45 | 36/45 | 37/45 | 38/45 | 39/45 |
|---|---|---|---|---|---|---|
| Voltage Deviation[%] | 0.1289 | 0.0707 | 0.1209 | 0.2183 | 0.3273 | 0.4345 |
| Phase angle Deviation[°] | 0.0000 | 0.0000 | 0.0000 | 0.0000 | 0.0000 | 0.0000 |
| Coil pitch | 40/45 | 41/45 | 42/45 | 43/45 | 44/45 | 45/45 |
| Voltage Deviation[%] | 0.5400 | 0.6443 | 0.7476 | 0.8501 | 0.9521 | 1.0539 |
| Phase angle Deviation[°] | 0.0000 | 0.0000 | 0.0000 | 0.0000 | 0.0000 | 0.0000 |

As described above, according to the sixth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Seventh Embodiment

Next, a seventh embodiment will be described with reference to FIG. 7. Here, the parts common to those of the first embodiment described above (FIG. 1) will not be repeatedly described, and the description will focus on the different parts.

Figure 7:
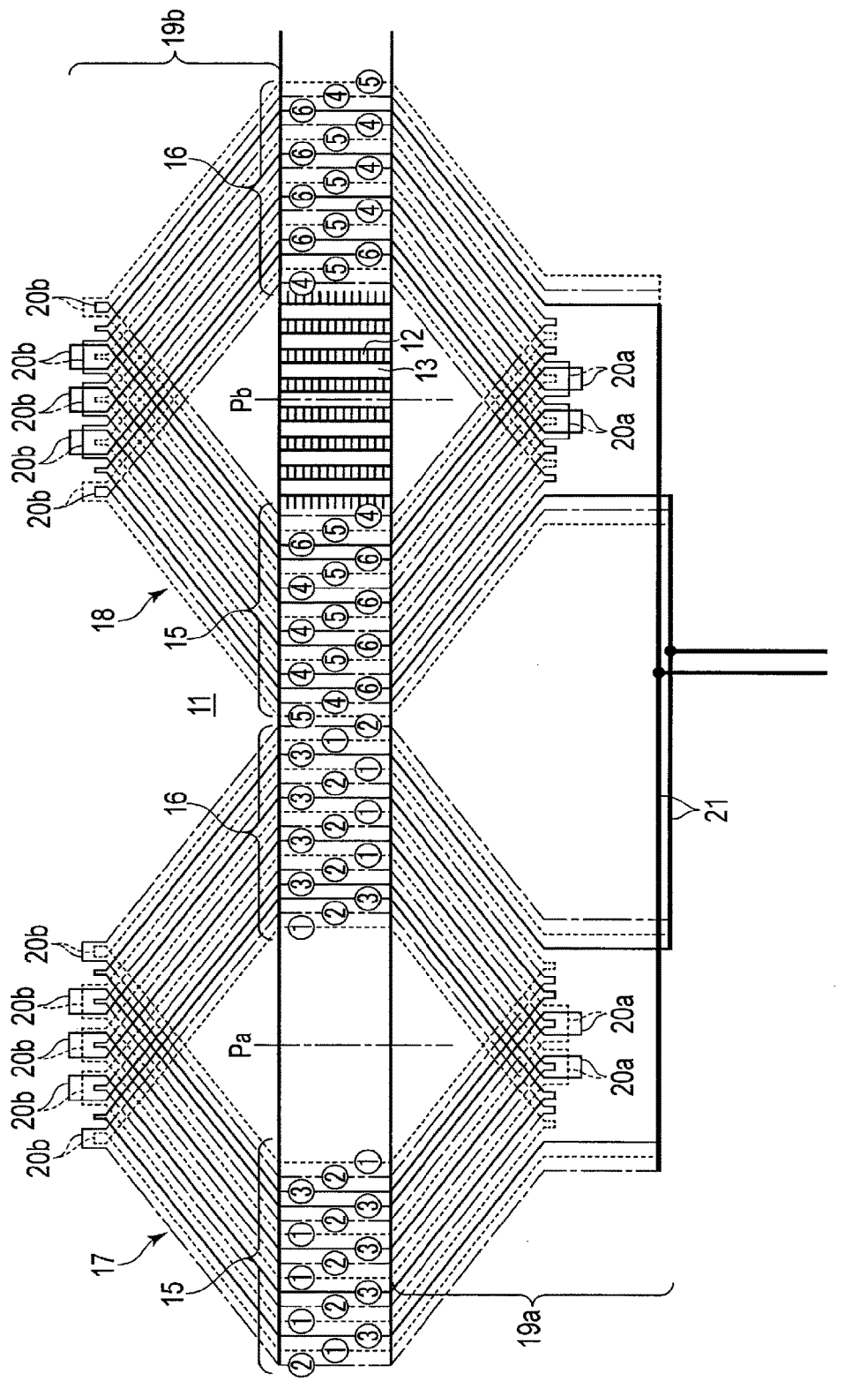
FIG. 7 is a developed perspective view illustrating a part of an armature winding of a rotating electrical machine for two poles/one phase according to a seventh embodiment.

FIG. 7 is a developed perspective view illustrating a part of an armature winding of a rotating electrical machine for two poles/one phase according to a seventh embodiment.

As illustrated in FIG. 7, eight jumper wires 20a per phase are provided in the connection side coil ends 19a of the phase belts 17 and 18, and twenty jumper wires 20b per phase are provided in the counter-connection side coil ends 19b, so that the circuits of the upper and lower coil pieces 15 and 16 of the first phase belt 17 are numbered "1, 2, 3, 3, 2, 1, 3, 2, 1, 3, 2, 1, 3, 1, 2" sequentially from the pole center, and the circuits of the upper and lower coil pieces 15 and 16 of the second phase belt 18 are numbered "4, 5, 6, 6, 5, 4, 6, 5, 4, 6, 5, 4, 6, 4, 5" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 19.

TABLE 19

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | 1 | | | | 1 | | | |
| | Lower coil piece | 1 | | | | 1 | | | |
| Parallel circuits 2, 5 | Upper coil piece | | 1 | | | 1 | | | 1 |
| | Lower coil piece | | 1 | | | 1 | | | 1 |
| Parallel circuits 3, 6 | Upper coil piece | | | 1 | 1 | | | 1 | |
| | Lower coil piece | | | 1 | 1 | | | 1 | |

| Relative positions from pole center | | 9 | 10 | 11 | 12 | 13 | 14 | 15 |
|---|---|---|---|---|---|---|---|---|
| Parallel circuits 1, 4 | Upper coil piece | 1 | | | 1 | 1 | | |
| | Lower coil piece | 1 | | | 1 | 1 | | |
| Parallel circuits 2, 5 | Upper coil piece | | | 1 | | | 1 | |
| | Lower coil piece | | | 1 | | | 1 | |
| Parallel circuits 3, 6 | Upper coil piece | | 1 | | 1 | | | |
| | Lower coil piece | | 1 | | 1 | | | |

As shown in Table 19, five upper and lower coil pieces 15 and 16 for each of the first and fourth parallel circuits are placed in the 1st, 6th, 9th, 12th, and 14th positions from the pole center, and five upper and lower coil pieces 15 and 16 for each of the second and fifth parallel circuits are placed in the 2nd, 5th, 8th, 11th, and 15th positions from the pole center. In addition, five upper and lower coil pieces 15 and 16 for each of the third and sixth parallel circuits are placed in the 3rd, 4th, 7th, 10th, and 13th positions from the pole center.

Table 20 shows the degree of balance of the voltage generated from the armature winding according to the seventh embodiment. Meanwhile, according to the seventh embodiment, the degree of balance varies depending on a coil pitch. Therefore, in Table 20, the coil pitch is set to "37/45 (82.22%)." As shown in Table 20, in the armature winding according to the seventh embodiment, a voltage deviation (a deviation of a p.u. voltage from 1.0) is "0.23%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 20

| Parallel circuit | 1 | 2 | 3 |
|---|---|---|---|
| Voltage Deviation [p.u.] | 0.2327 | −0.1014 | −0.1313 |
| Voltage phase [°] | 0.0000 | 0.0000 | 0.0000 |

| Parallel circuit | 4 | 5 | 6 |
|---|---|---|---|
| Voltage Deviation [p.u.] | 0.2327 | −0.1014 | −0.1313 |
| Voltage phase [°] | 0.0000 | 0.0000 | 0.0000 |

Table 21 shows a change of the maximum values of the voltage deviation and the phase angle deviation depending on a coil pitch according to the seventh embodiment. When the coil pitch is within a range of "36/45 to 40/45," the degree of balance satisfies the requirement of Habermann's patent, in which the voltage deviation be "0.4%" or smaller, and the phase angle deviation be "0.15°" or smaller. Furthermore, for example, even when the coil pitch varies (when the coil position is deviated), the phase angle deviation does not change (it is maintained at "0.0000°"), so that high reliability is constantly obtained.

TABLE 21

| Coil pitch | 34/45 | 35/45 | 36/45 | 37/45 | 38/45 | 39/45 |
|---|---|---|---|---|---|---|
| Voltage Deviation[%] | 0.6378 | 0.4648 | 0.3474 | 0.2327 | 0.1505 | 0.1988 |
| Phase angle Deviation[°] | 0.0000 | 0.0000 | 0.0000 | 0.0000 | 0.0000 | 0.0000 |
| Coil pitch | 40/45 | 41/45 | 42/45 | 43/45 | 44/45 | 45/45 |
| Voltage Deviation[%] | 0.3455 | 0.5000 | 0.6530 | 0.8049 | 0.9561 | 1.1069 |
| Phase angle Deviation[°] | 0.0000 | 0.0000 | 0.0000 | 0.0000 | 0.0000 | 0.0000 |

As described above, according to the seventh embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Eighth Embodiment

Next, an eighth embodiment will be described with reference to FIG. 8. Here, the parts common to those of the first embodiment described above (FIG. 1) will not be repeatedly described, and the description will focus on the different parts.

Figure 8:
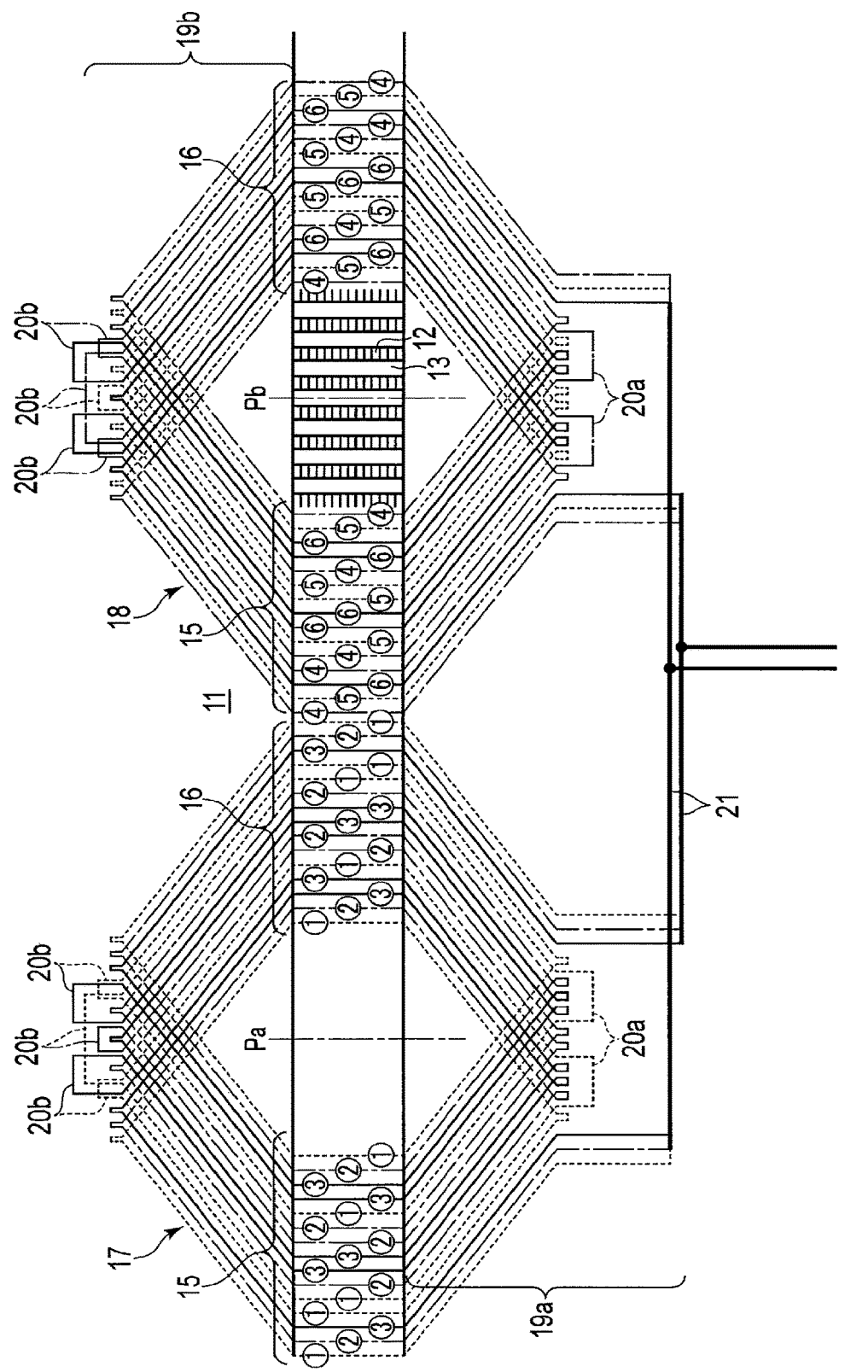
FIG. 8 is a developed perspective view illustrating a part of an armature winding of a rotating electrical machine for two poles/one phase according to an eighth embodiment.
Figure 9:
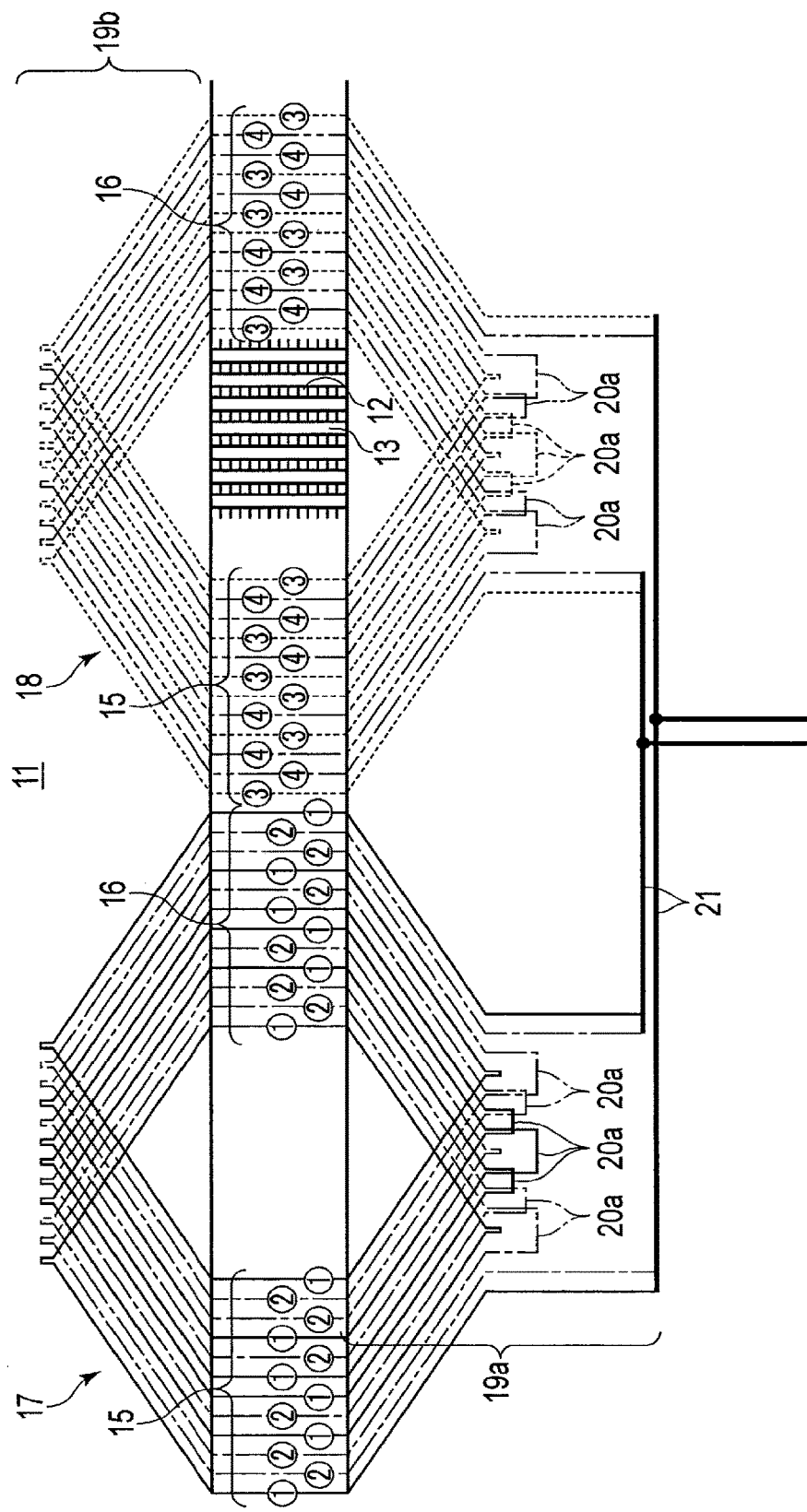
FIG. 9 is a developed perspective view illustrating a part of an armature winding of a rotating electrical machine for two poles/one phase according to prior art.
Figure 10:
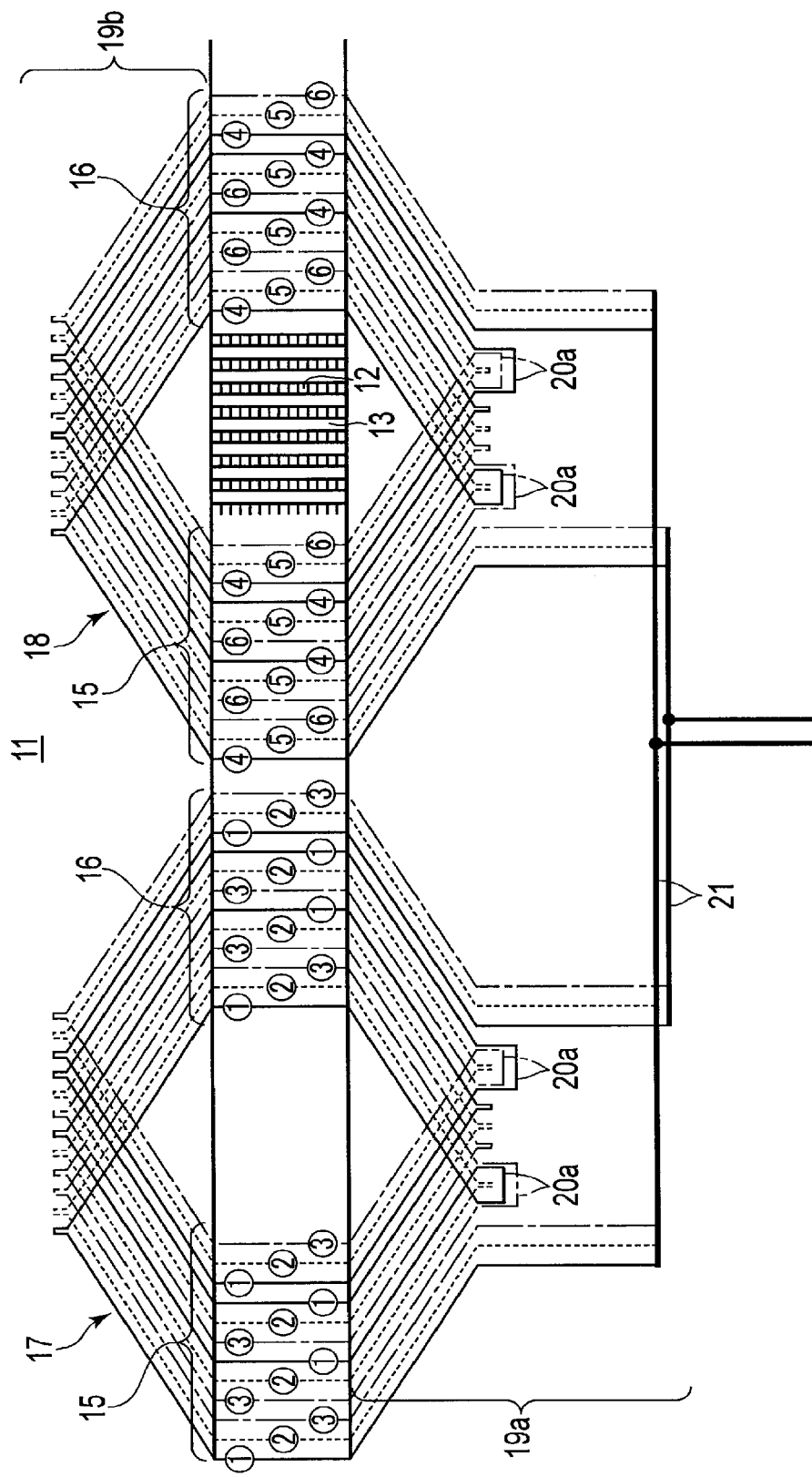
FIG. 10 is a developed perspective view illustrating a part of an armature winding of a rotating electrical machine for two poles/one phase according to prior art.

FIG. 8 is a developed perspective view illustrating a part of an armature winding of a rotating electrical machine for two poles/one phase according to an eighth embodiment.

As illustrated in FIG. 8, four jumper wires 20*a* per phase are provided in the connection side coil ends 19*a* of the phase belts 17 and 18, and twelve jumper wires 20*b* per phase are provided in the counter-connection side coil ends 19*b*, so that the circuits of the upper and lower coil pieces 15 and 16 of the first phase belt 17 are numbered "1, 2, 3, 3, 1, 2, 2, 3, 3, 2, 1, 1, 3, 2, 1" sequentially from the pole center, and the circuits of the upper and lower coil pieces 15 and 16 of the second phase belt 18 are numbered "4, 5, 6, 6, 4, 5, 5, 6, 6, 5, 4, 4, 6, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 22.

TABLE 22

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | 1 | | | | 1 | | | |
| | Lower coil piece | 1 | | | | 1 | | | |
| Parallel circuits 2, 5 | Upper coil piece | | 1 | | | | 1 | 1 | |
| | Lower coil piece | | 1 | | | | 1 | 1 | |
| Parallel circuits 3, 6 | Upper coil piece | | | 1 | 1 | | | | 1 |
| | Lower coil piece | | | 1 | 1 | | | | 1 |

| Relative positions from pole center | | 9 | 10 | 11 | 12 | 13 | 14 | 15 |
|---|---|---|---|---|---|---|---|---|
| Parallel circuits 1, 4 | Upper coil piece | | | 1 | 1 | | 1 | |
| | Lower coil piece | | | 1 | 1 | | 1 | |
| Parallel circuits 2, 5 | Upper coil piece | | 1 | | | 1 | | |
| | Lower coil piece | | 1 | | | 1 | | |
| Parallel circuits 3, 6 | Upper coil piece | 1 | | | 1 | | | |
| | Lower coil piece | 1 | | | 1 | | | |

As shown in Table 22, five upper and lower coil pieces 15 and 16 for each of the first and fourth parallel circuits are placed in the 1st, 5th, 11th, 12th, and 15th positions from the pole center, and five upper and lower coil pieces 15 and 16 for each of the second and fifth parallel circuits are placed in the 2nd, 6th, 7th, 10th, and 14th positions from the pole center. In addition, five upper and lower coil pieces 15 and 16 for each of the third and sixth parallel circuits are placed in the 3rd, 4th, 8th, 9th, and 13th positions from the pole center.

Table 23 shows the degree of balance of the voltage generated from the armature winding according to the eighth embodiment. Meanwhile, according to the eighth embodiment, the degree of balance varies depending on a coil pitch. Therefore, in Table 23, the coil pitch is set to "37/45 (82.22%)." As shown in Table 23, in the armature winding according to the eighth embodiment, a voltage deviation (a deviation of a p.u. voltage from 1.0) is "0.28%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 23

| Parallel circuit | 1 | 2 | 3 |
|---|---|---|---|
| Voltage Deviation [p.u.] | −0.2749 | 0.2004 | 0.0745 |
| Voltage phase [°] | 0.0000 | 0.0000 | 0.0000 |
| Parallel circuit | 4 | 5 | 6 |
| Voltage Deviation [p.u.] | −0.2749 | 0.2004 | 0.0745 |
| Voltage phase [°] | 0.0000 | 0.0000 | 0.0000 |

Table 24 shows a change of the maximum values of the voltage deviation and the phase angle deviation depending on a coil pitch according to the eighth embodiment. When the coil pitch is within a range of "35/45 to 37/45," the degree of balance satisfies the requirement of Habermann's patent, in which the voltage deviation be "0.4%" or smaller, and the phase angle deviation be "0.15°" or smaller. Furthermore, for example, even when the coil pitch varies (when the coil position is deviated), the phase angle deviation does not change (it is maintained at "0.0000°"), so that high reliability is constantly obtained.

TABLE 24

| Coil pitch | 34/45 | 35/45 | 36/45 | 37/45 | 38/45 | 39/45 |
|---|---|---|---|---|---|---|
| Voltage Deviation[%] | 0.4311 | 0.2584 | 0.1446 | 0.2749 | 0.4909 | 0.7031 |
| Phase angle Deviation[°] | 0.0000 | 0.0000 | 0.0000 | 0.0000 | 0.0000 | 0.0000 |
| Coil pitch | 40/45 | 41/45 | 42/45 | 43/45 | 44/45 | 45/45 |
| Voltage Deviation[%] | 0.9122 | 1.1188 | 1.3233 | 1.5263 | 1.7284 | 1.9299 |
| Phase angle Deviation[°] | 0.0000 | 0.0000 | 0.0000 | 0.0000 | 0.0000 | 0.0000 |

As described above, according to the eighth embodiment, it is possible to realize the degree of balance satisfying the requirement of Habermann's patent regarding the voltages of the parallel circuits and reduce an eddy current.

Note that the embodiment is not limited to the configuration described above. For example, the lead-out positions may be set differently from those described above, or the coil pieces located in electrically equivalent positions may be exchanged between the parallel circuits 1 and 4.

Common Features Throughout First to Eighth Embodiments

Structural features common to the armature windings throughout the first to eighth embodiments will be presented below.

There is provided a 3-phase even-numbered-pole 2-layered armature winding housed in 45 slots per pole provided in a laminated iron core of a rotating electrical machine.

For each phase of the winding, six parallel circuits are provided by dividing the coils into a pair of phase belts including the first and second phase belts 17 and 18. Each parallel circuit includes upper and lower coil pieces 15, 16 connected in series in the connection side coil end 19a and the counter-connection side coil end 19b.

The coil pieces 15, 16 corresponding to the first, second, and third parallel circuits are placed in the first phase belt 17. In addition, the coil pieces 15, 16 corresponding to the fourth, fifth, and sixth parallel circuits are placed in the second phase belt 18.

The upper coil pieces 15 and the lower coil pieces 16 of each parallel circuit are mutually placed in identical-numbered positions from a pole center.

As described above, according to each embodiment, it is possible to provide an armature winding structure having a number of slots suitable for an indirect cooling type large-capacity rotating electrical machine.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A 3-phase even-numbered-pole 2-layered armature winding housed in 45 slots per pole provided in a laminated iron core of a rotating electrical machine, comprising:
six parallel circuits provided for each phase of the winding and divided into a pair of phase belts including first and second phase belts, each parallel circuit including upper and lower coil pieces which are connected to each other in series in a connection side coil end and a counter-connection side coil end,
wherein the coil pieces corresponding to first, second, and third parallel circuits are placed in the first phase belt,
the coil pieces corresponding to fourth, fifth, and sixth parallel circuits are placed in the second phase belt, and
the upper coil pieces and the lower coil pieces of each parallel circuit are mutually placed in identical-numbered positions from a pole center.

2. The armature winding of the rotating electrical machine according to claim 1, wherein the upper and lower coil pieces of the first and fourth parallel circuits are placed in the 1st, 6th, 9th, 12th, and 15th positions from the pole center,
the upper and lower coil pieces of the second and fifth parallel circuits are placed in the 2nd, 5th, 8th, 11th, and 14th positions from the pole center, and the upper and lower coil pieces of the third and sixth parallel circuits are placed in the 3rd, 4th, 7th, 10th, and 13th positions from the pole center.

3. The armature winding of the rotating electrical machine according to claim 1, wherein the upper and lower coil pieces of the first and fourth parallel circuits are placed in the 1st, 7th, 8th, 12th, and 15th positions from the pole center,
the upper and lower coil pieces of the second and fifth parallel circuits are placed in the 2nd, 4th, 9th, 11th, and 14th positions from the pole center, and
the upper and lower coil pieces of the third and sixth parallel circuits are placed in the 3rd, 5th, 6th, 10th, and 13th positions from the pole center.

4. The armature winding of the rotating electrical machine according to claim 1, wherein the upper and lower coil pieces of the first and fourth parallel circuits are placed in the 1st, 6th, 9th, 10th, and 14th positions from the pole center,
the upper and lower coil pieces of the second and fifth parallel circuits are placed in the 2nd, 5th, 8th, 11th, and 15th positions from the pole center, and
the upper and lower coil pieces of the third and sixth parallel circuits are placed in the 3rd, 4th, 7th, 12th, and 13th positions from the pole center.

5. The armature winding of the rotating electrical machine according to claim 1, wherein the upper and lower coil pieces of the first and fourth parallel circuits are placed in the 1st, 6th, 9th, 13th, and 15th positions from the pole center,
the upper and lower coil pieces of the second and fifth parallel circuits are placed in the 2nd, 5th, 8th, 11th, and 14th positions from the pole center, and
the upper and lower coil pieces of the third and sixth parallel circuits are placed in the 3rd, 4th, 7th, 10th, and 12th positions from the pole center.

6. The armature winding of the rotating electrical machine according to claim 1, wherein the upper and lower coil pieces of the first and fourth parallel circuits are placed in the 1st, 7th, 8th, 11th, and 15th positions from the pole center,
the upper and lower coil pieces of the second and fifth parallel circuits are placed in the 2nd, 4th, 9th, 12th, and 14th positions from the pole center, and
the upper and lower coil pieces of the third and sixth parallel circuits are placed in the 3rd, 5th, 6th, 10th, and 13th positions from the pole center.

7. The armature winding of the rotating electrical machine according to claim 1, wherein the upper and lower coil pieces of the first and fourth parallel circuits are placed in the 1st, 7th, 8th, 10th, and 15th positions from the pole center,
the upper and lower coil pieces of the second and fifth parallel circuits are placed in the 2nd, 4th, 9th, 12th, and 14th positions from the pole center, and
the upper and lower coil pieces of the third and sixth parallel circuits are placed in the 3rd, 5th, 6th, 11th, and 13th positions from the pole center.

8. The armature winding of the rotating electrical machine according to claim 1, wherein the upper and lower coil pieces of the first and fourth parallel circuits are placed in the 1st, 6th, 9th, 12th, and 14th positions from the pole center,
the upper and lower coil pieces of the second and fifth parallel circuits are placed in the 2nd, 5th, 8th, 11th, and 15th positions from the pole center, and
the upper and lower coil pieces of the third and sixth parallel circuits are placed in the 3rd, 4th, 7th, 10th, and 13th positions from the pole center.

9. The armature winding of the rotating electrical machine according to claim 1, wherein the upper and lower coil pieces of the first and fourth parallel circuits are placed in the 1st, 5th, 11th, 12th, and 15th positions from the pole center,
the upper and lower coil pieces of the second and fifth parallel circuits are placed in the 2nd, 6th, 7th, 10th, and 14th positions from the pole center, and
the upper and lower coil pieces of the third and sixth parallel circuits are placed in the 3rd, 4th, 8th, 9th, and 13th positions from the pole center.

10. A rotating electrical machine comprising the armature winding according to claim 1.

* * * * *